United States Patent [19]
McGee

[11] 3,774,934
[45] Nov. 27, 1973

[54] SWING ARM TANDEM AIR SUSPENSION
[75] Inventor: Donald J. McGee, Troy, Mich.
[73] Assignee: H & H Equipment Co., Detroit, Mich.
[22] Filed: Feb. 16, 1972
[21] Appl. No.: 226,828

[52] U.S. Cl........ 280/104.5 A, 280/112 A, 280/111
[51] Int. Cl.............................................. B62d 21/02
[58] Field of Search................... 280/104.5 A, 111, 280/112 R, 112 A, 104.5 R

[56] References Cited
UNITED STATES PATENTS

| | | | |
|---|---|---|---|
| 2,754,131 | 7/1956 | Tulin | 280/104.5 A |
| 2,970,255 | 4/1961 | Rosenkrands | 280/112 A |
| 3,414,072 | 12/1968 | Hodges | 280/111 |
| 2,852,268 | 9/1958 | Johnson | 280/112 A |

Primary Examiner—Philip Goodman
Assistant Examiner—John A. Carroll
Attorney—Franklin E. Quale

[57] ABSTRACT

A low clearance flat bed trailer is sustained adjacent its rear by like air bag-equipped axle suspensions located at either side of the trailer bed. These afford a compounded walking beam and cantilever-type pivotal mounting of front-to-rear tandemed axles to the bed, through the agency of a horizontal, longitudinally extending and medially pivoted tubular rocker arm, and a tubular, transversely extending cantilever arm pivoted at one end to swing about a front-to-rear extending axis. This cantilever member has a substantial moment arm length from its pivot transversely outboard to a connection to a conventional leveling valve-equipped air bag. The walking beam or rocker arm has its medial transverse pivot mount directly above and on the free end of the cantilever arm, through the agency of a bearing on that end; and that bearing carries a horizontal outboard saddle on which the air bag is seated, in turn supporting at its top a bed frame superstructure. The fore and aft wheel axles have rigid connections to the rocker arm, extending transversely outwardly at 90° to the arm adjacent its opposite ends. The cantilever arm has its pivot on a fixed channel-type bracket structure of the trailer frame, to one side of the bed frame superstructure and substantially in the horizontal, low level plane of the bed as a whole. In addition, a pneumatic shock absorber acts between said superstructure and the longitudinal rocker arm to dampen out relatively high frequency of response of the arm tending to result from resilient air bag action. A type of torque rod unit, end clevis-connected to the rocker arm and trailer bed, operates to laterally restrain the tandem axles.

18 Claims, 4 Drawing Figures

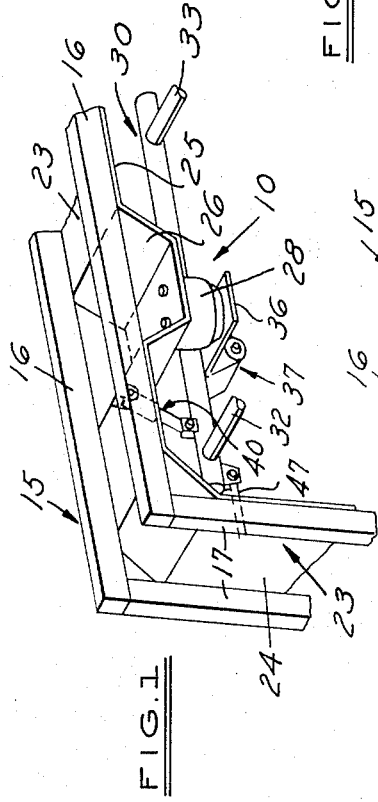

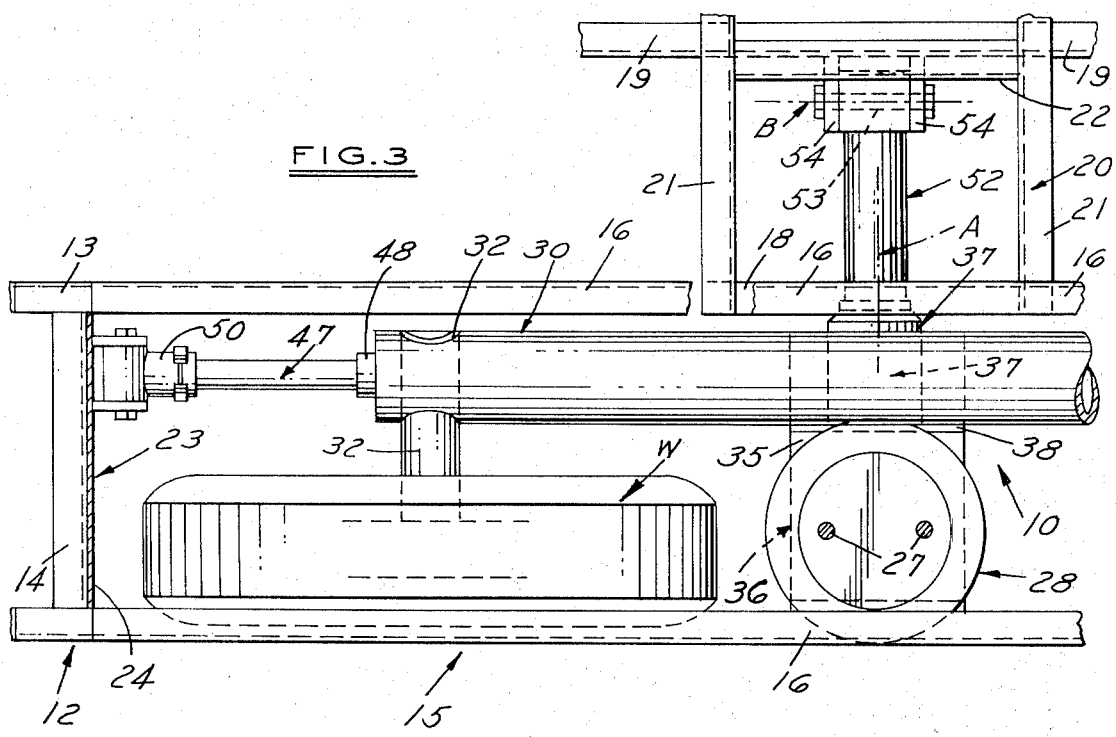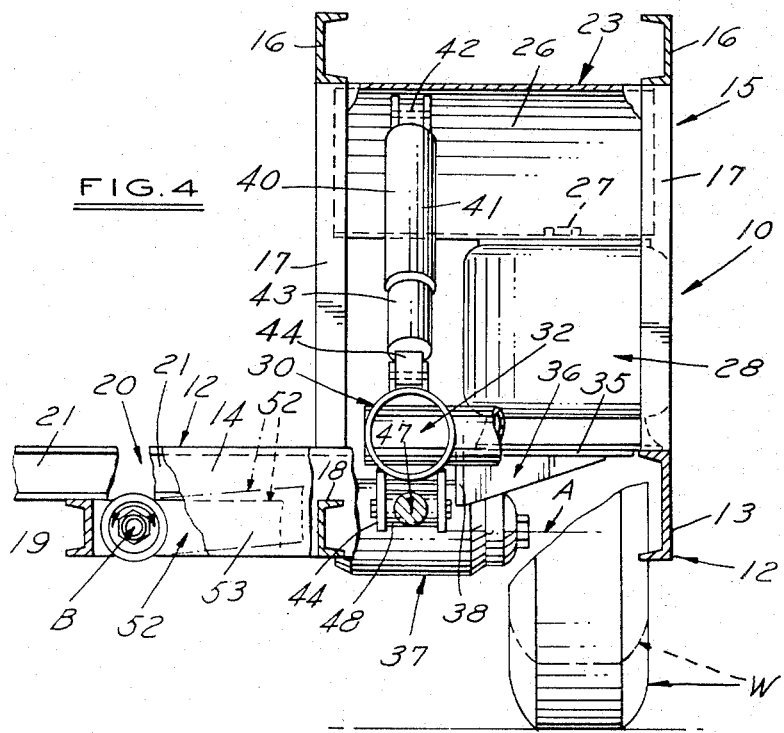

SWING ARM TANDEM AIR SUSPENSION

BACKGROUND OF THE INVENTION - FIELD

The suspension of the invention, as duplicated at opposite sides of a trailer, finds application in mobile load supports of this type which have a relatively low road clearance, for example, of the order of 9 inches. More particularly, the suspension is one well adapted for use in trailers in which it is desired to maintain constant ground or road clearance, whether the trailer is loaded or light; and to this end the suspension importantly supplements the stabilizing effect of its valved pneumatic air bag. Installations are contemplated in which it is desirable that both sets of tandem wheel and axle units enable the trailer bed to maintain a constant horizontal level in traversing severe irregularities of a road or ground surface which, if uncompensated, would violently rock the bed in the front-to-rear and/or side-to-side sense.

I am unaware of any prior art specifically dealing with this type of operation through the agency of a combination as generally referred to in the Abstract and detailed in the description to follow.

SUMMARY OF THE INVENTION

The elongated, walking beam-type rocker arm of the present suspension, as centrally pivoted on a transverse axis just inboard of and directly beneath the upright center of the load-sustaining air bag, permits a compensatory rocking movement of the suspension's tandem fore and aft wheel axles in the longitudinal and vertical plane of the wheels, which enables the latter to follow without loss of contact road or ground ruts and/or bumps of great size and severity.

By the same token, the suspension air bags at opposite sides of the vehicle bed, each as carried outboard of the rocker arm by a cantilever arm having a pivot to the bed frame well inwardly of the rocker arm, afford a vertical flexibility about horizontal front-to-rear axes at each side. The pneumatic bag is located well outwardly of such pivotal axis and about in the upright plane of the tandem wheels; the long moment arm from cantilever pivot to bag center thus provides a desired high degree of stability in action.

The suspension is, in general, further unique, to my knowledge, in that it mounts the transverse wheel axles in a welded and substantially unitary way to a longitudinal extending rocker arm-type support, rather than, as is ordinarily the case, to a transverse cross support structure.

Conventional bag leveling valve provisions coact with the compounded pivoting mentioned above to maintain a substantially constant road clearance of the trailer bed, empty or loaded; and a pneumatic shock absorber clevis-coupled at its ends between the rocker arm and bed superstructure dampens frequency of response of the arm to the bag for additional stability.

Considering such multiple features of advantage, the components of the improvement suspension are extremely simple and economical as to component and assembly costs.

BRIEF DESCRIPTION OF THE DRAWINGS

FIG. 1 is a fragmentary and considerably schematic perspective view of the improved suspension;

FIG. 2 is a fragmentary side elevational view in the direction of FIG. 1, indicating in solid and dot-dash line the longitudinal and vertical plane pivotal action of a walking beam or rocker arm component of the suspension in response to travel irregularity;

FIG. 3 is a fragmentary view of the suspension in horizontal section on line 3—3 of FIG. 2, being partially broken away at the zone of a supplemental frame structure, and in the interest of clarity omitting certain shock absorber means; and FIG. 4 is a rear-elevational view of the structure, being partially broken way and in transverse vertical section on broken line 4—4 of FIG. 2.

DESCRIPTION OF A PREFERRED EMBODIMENT

The improved suspension of the invention, as generally designated by the reference numeral 10, is shown typically as supporting a large and rugged horizontal load bed 12 which is essentially composed of a pair of elongated longitudinal frame side channels 13 integrally coupled by welding to front and rear cross channels 14. The front bed channel 14, as depicted in FIG. 2, is directly forward (or to the left) of a pair of like parallel, transversely spaced bed frame superstructures, generally designated 15, one at each of the opposite sides of the vehicle bed 12 and just to the rear of the latter.

Each such superstructure 15 is composed of a pair of like parallel and longitudinally extending, laterally spaced top channels 16 sustained at the front and rear thereof by vertical channels 17. These are welded to the respective top channels 16 and at their bottoms to the bed 12. Referring to FIGS. 3 and 4, it is seen that each superstructure 15 occupies but a small lateral space above the plane of bed 12 sufficient to accommodate the wheels W and associated structure of suspension 10 above that plane (to be described).

Parallel front-to-rear extending, outer and inner stringer channels 18, 19, respectively, constitute parts of an auxiliary frame structure, generally designated 20, which is located immediately inward of each superstructure 15, the outer channel 18 being welded at its ends between uprights 17 of the latter. The inner channel is sufficiently longer than member 18 to extend from a weld connection to the cross channel 14 of trailer bed 12 to a similar further frame or bed part (not shown) to the rear or right as viewed in FIG. 2.

A pair of parallel, coplanar and horizontal cross channels 21 extend inwardly at a right angle above the longitudinal stringer channels 18, 19, to which they are welded, thus in the main completing the auxiliary frame structure 20. The cross channel components 21 of this secondary frame sub-assembly preferably extend across the width of the vehicle, having corresponding connections to components of the bed and frame superstructure 15 at the opposite side, and thereby additionally rigidifying and reinforcing the suspension and vehicle assembly as a whole. Furthermore, it is contemplated that additional brace components may be utilized as desired, such as a cross iron 22 between channels 21, and other similar means which are not shown.

Each superstructure 15 is equipped with a stamped sheet metal bracket plate 23 of a width substantially equal to its own, the plate including vertical front and rear portions 24 which are welded to corresponding superstructure uprights 17. Horizontal intermediate portions 25 bond to the bottom of top superstructure channels 16, and a depending formation 26 of a truncated V cross section constitutes a bag-engaging bracket portion. This has a bolted connection at 27 to the circular top plate of a conventional leveling valve stabilized suspension air bag 28 of conventional manufacture, which is connected to other components of structure 10 by means now to be described.

Such means essentially comprise an elongated and longitudinally extending rocker or walking beam arm 30 of tubular cross-section, which is diametrically apertured horizontally adjacent its rear and front extremities to receive the respective inner ends of the forward and rear tubular axles 32, 33 (FIG. 2), with a weld about the respective tubular members in effect uniting them integrally and rigidly with the apertures in the wall of rocker arm 30. Thus, the axles 32, 33 are uniquely mounted fixedly in an integrally bonded relation at 90° to a longitudinal suspension arm; and the wheels W mount conventionally to said axles The pneumatic suspension bag 28 is conventionally equipped at its bottom with a mounting base 34 which rests upon and is secured to the top horizontal plate 35 of a bottom flange-reinforced bracket 36. This straddles the top of a cylindrical pivot bearing 37 (FIGS. 2 and 4) on a cantilever arm to be described, as at an inner vertical saddle flange 38 of bracket 36, at which flange the bracket is firmly welded to the outer housing of bearing 37. Flange 38 also has an arcuate upper stirrup formation cradling the axle 32 or 33.

Accordingly, bracket 36, as thus fixed to cantilever arm bearing 37, affords a mount midway between the axles 32, 33 at which the walking beam or rocker arm 30 may swing a limited number of degrees in a vertical plane about an axis A, as between the solid and dot-dash line positions of FIG. 2, as a wheel W may rise and fall between those positions.

A conventional pneumatic shock absorber 40 has its tubular outer sleeve 41 connected at its top to the truncated-V bracket portion 26 of superstructure stamping 23, as at a clevis 42, with the inner plunger element 43 bottom-connected by a clevis 44 between ears 45 welded on the top of rocker arm 30. As above indicated, the action of shock 40 is to dampen any vibration or chatter frequency normal to the operation of pneumatic bag 28, and thus contribute to stability.

Suspension 10 is further stabilized by a rigid connector rod unit 47, which forwardly connects to the forward extremity of rocker arm 30 through a clevis member 48 acting between ears 49 welded on that arm, there being another clevis connection 50 of rod 47 to the bed channel structure 12.

Now referring specially to FIGS. 3 and 4, the bearing 37, at which arm 30 has its pivotal axis A for rocking in a front-to-rear vertical plane, is carried by a transverse cantilever arm tube 52 of substantial diameter which, at its pivot end opposite bearing 37, has a pivotal mount on a short stud 53 which extends longitudinally through a pair of bracket arms 54 welded to the auxiliary inner frame stringer 19. Tube 52 thus swings about a front-rear horizontal axis B at the center line of stud 53, compounding with the rocker arm pivot on axis A of the bearing 37. This enables the axles 32 and 33 to float stably on a moment arm arc of large diameter, represented by the transverse distance between axis B and the upright center of air bag 28.

The rear axle suspension affords high or low load capacity, as associated with air ride advantages in point of a soft action under light loads and increasingly great stiffness as loads increase, under all conditions; and the shock absorber feature, which is double acting in nature, greatly assists in rebound control.

What is claimed is:

1. A suspension for a vehicle frame, comprising an elongated pivotal rocker arm having a wheel axle member fixedly mounted thereon in substantially spaced relation to a pivot axis thereof, said member extending horizontally normal to the rocker arm and a vertical first plane of swing of the latter about said axis, means supporting said rocker arm for swing in a second vertical plane normal to the first plane, and means sustaining a structural portion of said frame on said supporting means for a compounded bodily up and down motion in said planes.

2. The suspension of claim 1, in which said sustaining means further comprises a resiliently compressible device supporting said frame portion on one of said arms.

3. The suspension of claim 2, in which said device is an inflatable air bag.

4. A suspension for a vehicle frame, comprising an elongated and longitudinally front-to-rear extending pivotal rocker arm having parallel wheel axle members fixedly mounted thereon in substantially spaced relation to and paralleling and on opposite sides of a pivot axis of said arm, said members extending horizontally normal to the rocker arm and a vertical first plane of swing of the latter about said axis, means supporting said rocker arm for swing in a second vertical plane normal to the first plane, and means sustaining a structural portion of said frame on said supporting means for a bodily up and down motion as compounded with the swing of said rocker arm about its said axis.

5. The suspension of claim 4, in which said supporting means comprises a transversely elongated cantilever arm pivotally connected on a longitudinal axis in relation to said vehicle frame and sustaining said rocker arm adjacent a longitudinal midpoint of the latter, the axis of swing of said rocker arm substantially coinciding with a transverse axis of the cantilever arm.

6. The suspension of claim 5, in which said cantilever arm has its pivotal frame connection adjacent an end well inwardly of the plane of swing of the rocker arm, the rocker arm having a pivotal mount on the cantilever arm well outwardly of said pivotal connection of the latter.

7. The suspension of claim 4, in which said sustaining means further comprises a resiliently compressible device supporting said frame portion on one of said arms.

8. The suspension of claim 7, in which said device is an inflatable air bag.

9. A suspension for a vehicle frame, comprising an elongated pivotal rocker arm having a wheel axle member fixedly mounted thereon in substantially spaced relation to a pivot axis thereof, said member extending horizontally normal to the rocker arm and a plane of swing of the latter about said axis, and means sustaining a structural portion of said frame on said arm for a bodily up and down motion, said last named means comprising a transversely elongated cantilever arm pivotally connected on a longitudinal axis in relation to said vehicle frame and sustaining said rocker arm, the axis of swing of said rocker arm substantially coinciding with a transverse axis of the cantilever arm.

10. The suspension of claim 9, in which said sustaining means further comprises a resiliently compressible device supporting said frame portion on one of said arms.

11. The suspension of claim 9, in which said cantilever arm has its pivotal frame connection adjacent an end well inwardly of the plane of swing of the rocker arm, the rocker arm having a pivotal mount on the cantilever arm well outwardly of said pivotal connection of the latter.

12. The suspension of claim 11, in which said sustaining means further comprises a resiliently compressible device supporting said frame portion on said cantilever arm.

13. The suspension of claim 12, in which said device is an inflatable air bag.

14. A suspension for a vehicle frame, comprising an elongated and longitudinally extending pivotal rocker arm having parallel wheel axle members fixedly mounted thereon in substantially spaced relation to and on opposite sides of a pivot axis thereof, said members extending horizontally normal to the rocker arm and a plane of swing of the latter about said axis, and means sustaining a structural portion of said frame on said arm for a bodily up and down motion as compounded with a swing of said rocker arm about its said axis, said last named means comprising a transversely elongated cantilever arm pivotally connected on a longitudinal axis in relation to said vehicle frame and sustaining said rocker arm adjacent a longitudinal midpoint of the latter, the axis of swing of said rocker arm substantially coinciding with a transverse axis of the cantilever arm.

15. The suspension of claim 14, in which said sustaining means further comprises a resiliently compressible device supporting said frame portion on one of said arms.

16. The suspension of claim 14, in which said cantilever arm has its pivotal frame connection adjacent an end well inwardly of the plane of swing of the rocker arm, the rocker arm having a pivotal mount on the cantilever arm well outwardly of said pivotal connection of the latter.

17. The suspension of claim 16, in which said sustaining means further comprises a resiliently compressible device supporting said frame portion on said cantilever arm outboard of said rocker arm.

18. The suspension of claim 17, in which said device is an inflatable air bag.

* * * * *